L. F. TANNER.
Farm Gate.
No. 81,558. Patented Aug. 25, 1868.
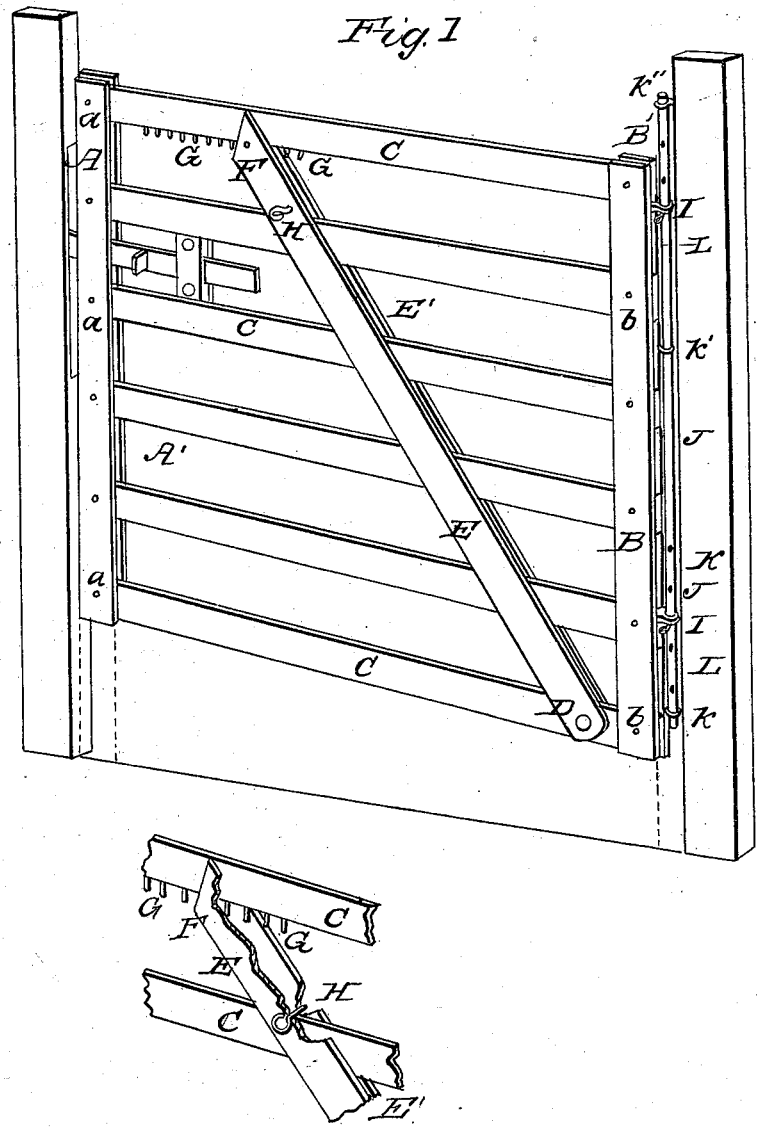

United States Patent Office.

LOVEL F. TANNER, OF MILAN, INDIANA.

Letters Patent No. 81,558, dated August 25, 1868.

IMPROVEMENT IN FARM-GATE.

*The Schedule referred to in these Letters Patent and making part of the same.*

TO ALL WHOM IT MAY CONCERN:

Be it known that I, LOVEL F. TANNER, of Milan, Ripley county, Indiana, have invented a new and useful Farm-Gate; and I do hereby declare the following to be a full, clear, and exact description thereof, reference being had to the accompanying drawings, making part of this specification.

My invention relates to that class of farm-gates which are loose-jointed, so as to permit of their free ends being elevated for the purpose of taking out the "sag," and the first part of my improvement consists in devices for accomplishing that result. The second part of my invention consists in hanging the gate in such a manner that it can be lifted bodily, and maintained in an elevated position, for the purpose of allowing it to swing clear of snow, ice, and other obstructions.

In the accompanying drawings—

Figure 1 is a perspective view of a farm-gate, provided with my improvements.

Figure 2 is an enlarged view of the devices which retain the straining-brace in position, the last view being partially in section.

My gate consists essentially of two outer stiles, A A', two inner ones, B B', and a series of rails, C, the ends of the latter being inserted between said stiles, and connected thereto by the pivots $a$ and $b$.

Attached, by a bolt, D, to the inner end of the lower rail, C, are two straining-braces, E E', which extend diagonally across the gate, and the upper ends of these braces are pierced for the reception of a pin, F, which is adapted to engage between studs, G, that project downwardly from the under side of the upper rail.

H is a removable pin, which passes through both of the braces E E' immediately above any one of the intermediate rails C, but preferably above that rail which is next to the top one.

When the outer end of the gate has settled down, the "sag" can be taken out of it in the following manner:

The pin H is first removed, and the outer end of the gate is elevated as much as may be necessary, in order to take out the "sag," after which the upper ends of the braces E E' are pushed back so as to cause its pin, F, to engage between two of the rear studs G, and the removable pin H being again inserted in its place, the gate is in condition for use.

In order to lift the gate bodily above the ground, so that it may swing clear of snow, ice, and other obstructions, I suspend it from the gate-post in the following manner:

The stiles B B' have attached to them eyes, I I', that are adapted to play freely upon the rod or pintle J, which is secured to the gate-post K by means of staples, $k$ $k'$ $k''$.

The lower end of the rod J is provided with a series of apertures, $j$, for the reception of a pin, L, which, being inserted in either of said apertures, serves to support the lower hinge or eye I of the gate.

In the winter-season, when the ground is covered with snow and ice, the gate is elevated, and the pin L inserted in either of the upper apertures, and the gate can be maintained in such an elevated position as long as may be desired.

If preferred, the upper end of the rod or pintle may be provided with another series of apertures, $j'$, and an additional pin, L', although in most cases, and especially when the gate is not heavy, the lower apertures and pin will be sufficient.

It will be seen that my gate is very simple in its construction, not liable to get out of order, and it can be operated in a few minutes.

Besides the uses above cited, the gate may, when desired, be made available for letting through smaller stock, such as pigs, while retaining larger stock, either by elevating the front stile, or the entire gate, as already explained.

I claim herein as new, and of my invention—

1. The combination of the removable locking-pin H with the thrusting-braces or struts E E', studs G, and gate A B C, substantially as and for the purposes specified.

2. The arrangement, substantially as described, of the eyes I I', perforated rod J $j$, staples $k$ $k'$, and pin L, for the object explained.

In testimony of which invention, I hereunto set my hand.

LOVEL F. TANNER.

Witnesses:
E. W. WOOD,
THOS. J. TERRITT.